United States Patent
Crandall et al.

(10) Patent No.: US 6,296,932 B1
(45) Date of Patent: Oct. 2, 2001

(54) MICROSPHERE ADHESIVE COATED ARTICLE FOR USE WITH COATED PAPERS

(75) Inventors: Michael D. Crandall, North Oaks; Terrence E. Cooprider, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/211,157

(22) Filed: Dec. 14, 1998

(51) Int. Cl.$^7$ .......................................................... C09J 7/02
(52) U.S. Cl. .................................. 428/355 AC; 524/801; 523/223; 521/56; 521/60; 521/63; 521/64; 442/151; 428/355 RA; 428/355 CN; 428/402
(58) Field of Search ..................... 428/355 RA, 355 AC, 428/355 CN, 352, 402; 442/151; 524/801; 523/223; 521/56, 60, 63, 64

(56) References Cited

U.S. PATENT DOCUMENTS

| | | |
|---|---|---|
| Re. 24,906 | * 12/1960 | Ulrich ........................ 206/59 |
| 3,024,221 | 3/1962 | Le Fevre et al. . |
| 3,620,988 | 11/1971 | Cohen . |
| 3,691,140 | 9/1972 | Silver . |
| 3,857,731 | 12/1974 | Merrill, Jr. et al. . |
| 4,166,152 | 8/1979 | Baker et al. . |
| 4,786,696 | 11/1988 | Bohnel . |
| 4,810,763 | 3/1989 | Mallya et al. . |
| 4,855,170 | 8/1989 | Darvell et al. . |
| 4,968,562 | 11/1990 | Delgado . |
| 4,988,567 | 1/1991 | Delgado . |
| 4,994,322 | 2/1991 | Delgado et al. . |
| 5,045,569 | 9/1991 | Delgado . |
| 5,118,750 | 6/1992 | Silver et al. . |
| 5,266,402 | 11/1993 | Delgado et al. . |
| 5,326,842 | 7/1994 | Knudsen et al. . |
| 5,508,313 | 4/1996 | Delgado et al. . |
| 5,514,122 | 5/1996 | Morris et al. . |
| 5,571,617 | 11/1996 | Cooprider et al. . |
| 5,614,310 | 3/1997 | Delgado et al. . |
| 5,714,237 | 2/1998 | Cooprider et al. . |
| 5,756,625 | 5/1998 | Crandall et al. . |
| 5,824,748 | 10/1998 | Kesti et al. . |

FOREIGN PATENT DOCUMENTS

| | | |
|---|---|---|
| 63-260973 | 10/1988 | (JP) . |
| WO 94/20586 | 9/1994 | (WO) . |
| WO 94 22971 A | 10/1994 | (WO) . |

OTHER PUBLICATIONS

Handbook of Pressure Sensitive Adhesive Technology, 2$^{nd}$ Edition, Edited by Donatas Satas, N.Y. Van Nostrand Reinhold, 1989. pp. 585–600.

* cited by examiner

*Primary Examiner*—Daniel Zirker
(74) *Attorney, Agent, or Firm*—Carolyn V. Peters

(57) ABSTRACT

An adhesive coated article comprises a layer of microsphere adhesive onto a portion of at least one major surface of a substrate. The microspheres in the adhesive are obtained as the reaction product of (a) at least one alkyl (meth)acrylate ester wherein the alkyl group contains four to about 14 carbon atoms, preferably four to about 10 carbon atoms and (b) a comonomer(s). The comonomer may be a nonpolar, ionic, polar comonomer or mixtures of such monomers. This microsphere adhesive either contains a (meth)acrylamide comonomer or a polyacrylamide material is post-added to the microsphere adhesive. The adhesive exhibits a lower than expected adhesion to coated papers without sacrificing the adhesion to standard uncoated (bond) papers and preferably, the 90° peel adhesion, as measured on Kromkote® paper (used as an industry standard) is in the range of 20 to 250 grams/inch.

7 Claims, No Drawings

MICROSPHERE ADHESIVE COATED ARTICLE FOR USE WITH COATED PAPERS

FIELD OF INVENTION

This invention relates to adhesive coated articles and in particular to microsphere adhesives coated onto a substrate particularly useful on coated paper.

BACKGROUND OF THE INVENTION

Repositionable notes, flags and markers have become a readily recognizable part of the office and home. Repositionable notes and flags, such as those manufactured by 3M under the tradename of POST-IT® Notes and POST-IT® Flags are used to mark documents for reproduction, for ready reference, to communicate comments or concerns to another reader, your favorite recipe, a well-loved passage in a book and so on. These products are convenient, easy to use and easy to reposition from one portion of a document to another.

Coated or "glossy" paper, as it is sometimes called, is used in the printing of covers, magazines, sales pieces, direct mail, reply cards, and brochures. The most distinguishing feature of coated paper is that printing inks will sit on top of the coating (ink tends to soak into a sheet of uncoated stock). The result is a clean, sharp image. For this reason, coated papers are used when precise color matches, extremely clear detail, or the faithful reproduction of photography (both color and black-and-white) is desired. Although coated stock is generally more expensive than uncoated, it is the paper of choice for fine quality printing.

There are two basic categories of paper finishes commonly used today: uncoated and coated. All paper starts out uncoated, and it is commonly used in this form. The non-glare surface of uncoated paper makes it suitable for all types of reading material, and so it is used extensively in paperbacks, newsletters and newer textbooks. Generally, the term "coated paper" refers to paper and paperboard, of which the surface has been treated with clay or some other pigment and adhesive mixture, or other suitable material, to improve the finish with respect to printing quality, color, smoothness, opacity or other surface properties. The term is also applied to lacquered and varnished papers.

However, with coated papers, the repositionable adhesive that allows a repositionable note or flag to be used, lifted and reused, has a tendency to build adhesion and form a more permanent bond between the note or flag and the paper upon which you are attaching the note or flag. Hence when marking magazines or catalogues or even older textbooks (use of coated papers) with notes or flags, there is the possibility that the repositionable note or flag may become more permanently attached. Such behavior is generally referred to as "adhesion build" and is not generally observed with uncoated papers.

Thus, there is a need to produce a repositionable adhesive coated article that retains the repositionability characteristic of the adhesive when used on coated papers.

SUMMARY OF THE INVENTION

Briefly, in one aspect of this invention an adhesive coated article is provided comprising a layer of microsphere adhesive onto a portion of at least one major surface of a substrate. The microspheres in the adhesive are obtained as the reaction product of (a) at least one alkyl (meth)acrylate ester wherein the alkyl group contains four to about 14 carbon atoms, preferably four to about 10 carbon atoms and (b) a comonomer(s). The comonomer may be a nonpolar, ionic, polar comonomer or mixtures of such monomers. This microsphere adhesive exhibits a lower than expected adhesion to coated papers without sacrificing the adhesion to standard uncoated (bond) papers. Preferably, the 90° peel adhesion, as measured on Kromkote® paper (used as an industry standard) is in the range of 20 to 250 grams/inch.

Advantageously, the microsphere adhesive used in the present invention can either contain microspheres that have been formulated with a (meth)acrylamide containing comonomer ("in situ") or a polyacrylamide material can be added to a microsphere adhesive ("post-add"), even if the microspheres do not contain a (meth)acrylamide comonomer.

In another aspect of this invention microspheres are made as described in U.S. Pat. No. 3,691,140 (Silver). The resultant microspheres are coagulated and redispersed in solvent. To this organic solvent dispersion an aqueous polyacrylamide material is added and mixed into the dispersion at a loading of 1–10% by weight. This material is then coated onto a suitable backing. With this aspect of the invention other microspheres made by such methods as described in U.S. Pat. No. 5,571,617 (Cooprider et al.); U.S. Pat. No. 5,714,237 (Cooprider et al); U.S. Pat. No. 5,118,750 (Silver et al); U.S. Pat. No. 5,045,569 (Delgado); U.S. Pat. No. 5,824,748 (Kesti et al); U.S. Pat. No. 4,786,696 (Bohnel); and U.S. Pat. No. 5,756,625 (Crandall et al) may be used in combination with the polyacrylamide, either in solvent or aqueous form, to form adhesive combinations with lower adhesion to coated paper without sacrificing the adhesion to uncoated (bond) papers.

As used in this application:
"adhesive coated article" refers to an article having at least a portion of a substrate coated with an adhesive;
"coated paper" refers to paper and paperboard, of which the surface has been treated with clay or some other pigment and adhesive mixture, or other suitable material, to improve the finish with respect to printing quality, color, smoothness, opacity or other surface properties and term is also applied to lacquered and varnished papers.

DESCRIPTION OF THE PREFERRED EMBODIMENT(S)

Useful alkyl (meth)acrylate monomers are those monofunctional unsaturated (meth)acrylate esters, the alkyl groups of which have from 4 to 14 carbons atoms. Such (meth)acrylates are oleophilic, water dispersible, and are essentially water insoluble. Furthermore, useful (meth)acrylates are those that as homopolymers, generally have a glass transition temperature below about −20° C., or if a combination of monomers is used, such a combination would produce a copolymer or terpolymer generally having a glass transition temperature below about −20° C. Nonlimiting examples of such (meth)acrylates included but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, t-butyl acrylate, t-butyl methacrylate, isobornyl acrylate, methylmethacrylate, isononyl acrylate, isodecyl acrylate and the like, and the combination thereof.

Preferred alkyl (meth)acrylate monomers include isooctyl acrylate, isononyl acrylate, isoamyl acrylate, isodecyl acrylate, 2-ethylhexyl acrylate, n-butyl acrylate, sec-butyl acrylate and mixtures thereof.

Vinyl ester monomers suitable for use in the present invention include but are not limited to: vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 1 to 14 carbon atoms, which as homopolymers have glass transition temperatures below about $-10°$ C. Preferred vinyl ester monomers include vinyl laurate, vinyl caprate, vinyl 2-ethylhexanoate, and mixtures thereof.

Additional other vinyl monomers which, as homopolymers, have glass transition temperatures higher than about $-10°$ C. to $0°$ C., such as vinyl acetate, acrylonitrile, mixtures thereof and the like, may optionally be utilized in conjunction with one or more of the acrylate, methacrylate and vinyl ester monomers provided the glass transition temperature of the resultant polymer is below about $-10°$ C.

Suitable comonomers include nonpolar, ionic, polar monomers and mixtures thereof. In addition to using one or more acrylate monomers as a comonomer, as described above, the following are non-limiting examples of comonomers:

(1) ionic comonomers, such as sodium methacrylate, ammonium acrylate, sodium acrylate, (I) trimethylamine p-vinyl benzimide, (II) 4,4,9-trimethyl-4-azonia-7-oxo-8-oxa-dec-9-ene-1-sulphonate, (III) N,N-dimethyl-N-β-methacryloxyethyl) ammonium propionate betaine, (IV) trimethylamine methacrylimide, (V) 1,1-dimethyl-1(2,3-dihydroxypropyl)amine methacrylimide; any zwitterionic monomer and the like;

(2) non-polar comonomers include but are not limited to, 4-methyl-2-pentyl acrylate, 2-methylbutyl acrylate, isoamyl acrylate, sec-butyl acrylate, n-butyl acrylate, isodecyl methacrylate, t-butyl acrylate, t-butyl methacrylate, isobornyl acrylate, octyl acrylamide, methylmethacrylate, isononyl acrylate, isodecyl acrylate, styrene and the like, and the combination thereof (3) polar comonomers may or may not contain a dissociable hydrogen. Examples of suitable polar comonomers include organic carboxylic acids comprising 3 to about 12 carbon atoms and having generally 1 to about 4 carboxylic acid moieties. Nonlimiting examples of such monomers acrylic acid, methacrylic acid, itaconic acid, fumaric acid, crotonic acid, maleic acid, β-carboxyethylacrylate and the like. In addition suitable polar comonomers include acrylamide, methacrylamide, 2-hydroxyethyl acrylate, and the like.

In addition, one class of suitable comonomers is aminofunctional monomers having a nucleus or portion of the nucleus of the general formula (a):

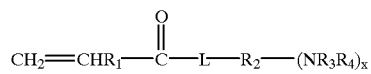

(1)

wherein
$R_1$ is —H, —CH$_3$, —CH$_2$CH$_3$, cyano or carboxymethyl;
$R_2$ is a hydrocarbyl radical comprising 1 to about 12 carbon atoms;
$R_3$ and $R_4$ are independently H or an alkyl group containing 1 to about 12 carbon atoms or an arylalkyl group or together form a cyclic or heterocyclic moiety;
L is carbon-carbon bond, O, NH or S; and
x is an integer of 1 to 3.

Nonlimiting examples of comonomers according to formula (1) include N,N-dimethyl-aminoethyl(methyl)acrylate, N,N-dimethylaminopropyl(meth)acrylate, t-butylaminoethyl(methyl)acrylate and N,N-diethylaminoacrylate.

Another class of suitable comonomers is comonomers having a nucleus or portion of the nucleus of the general formula (2):

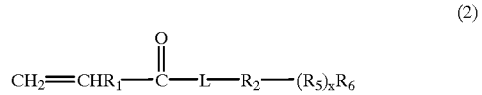

wherein
$R_1$ is H, —CH$_3$, —CH$_2$CH$_3$, cyano or carboxymethyl;
$R_2$ is a hydrocarbyl radical comprising 1 to about 12 carbon atoms;
$R_5$ is —O—, alkylene oxide comprising 1 to 5 carbon atoms, or phenoxy oxide, wherein the alkylene oxide would include, —CH$_2$O—, —CH$_2$CH$_2$O—, —CH$_2$(CH)CH$_3$O—, and the like;
$R_6$ is H, —C$_6$H$_4$OH, or —CH$_3$
L is a carbon-carbon bond, O, NH or S; and
x is an integer with the proviso that when $R_5$ is —O—, x is an integer of 1–3.

Nonlimiting examples of comonomers according to formula (2) include hydroxyethyl (meth)acrylate, glycerol mono(meth)acrylate and 4-hydroxybutyl (meth)acrylate, acrylate terminated poly(ethylene oxide); methacrylate terminated poly(ethylene oxide); methoxy poly(ethylene oxide) methacrylate; butoxy poly(ethylene oxide) methacrylate; acrylate terminated poly(ethylene glycol); methacrylate terminated poly(ethylene glycol); methoxy poly(ethylene glycol) methacrylate; butoxy poly(ethylene glycol) methacrylate and mixtures thereof.

Yet another class of suitable comonomers are amidofunctional monomers having a nucleus or portion of the nucleus of the general formula (3):

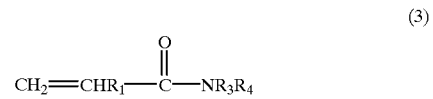

wherein
$R_1$ is H, CH$_3$, CH$_2$CH$_3$, cyano or carboxymethyl; and
$R_3$, $R_4$ are independently H or an alkyl group containing 1 to about 12 carbons or an arylalkyl group or together form a cyclic or heterocyclic moiety.

Nonlimiting examples of comonomers according to formula (3) include N-vinyl pyrrolidone, N-vinyl caprolactam, acrylamide or N,N-dimethyl acrylamide.

Nonlimiting examples of other suitable comonomers that do not fall within the above classes but are within the scope of permissible comononers include (meth)acrylonitrile, furfuryl (meth)acrylate and tetrahydrofurfuryl (meth)acrylate, 2-vinyl pyridine, and 4-vinyl pyridine.

Typically, when a comonomer is present, the relative amounts by weight of the alkyl (meth)acrylate monomer(s) and the comonomer is in the range of about 99.5/0.5 to 75/25, and preferably is in the range of 98/2 to 90/10.

In addition, a vinyl unsaturated additive may be used to improve stability and performance. Suitable vinylunsaturated additives having both an ionic moiety and a hydrophobic moiety and containing at least 5 but not more than 40 carbon atoms include: the salts of sulfoesters of alpha-methylene carboxylic acids such as 2-sulfoethyl acrylate, 2-sulfoethyl methacrylate, 2-sulfoethyl α-ethylacrylate, 2-sulfoethyl α-hexylacrylate, 2-sulfoethyl α-cyclohexylacrylate, 2-sulfoethyl α-chloroacrylate, 2-sulfo-1-propyl acrylate, 2-sulfo-1-butyl acrylate and methacrylate, 3-sulfo-2-butyl acrylate and methacrylate, 2-methyl-1-sulfo-2-propyl acrylate and methacrylate, 3-bromo-2-sulfo-1-propyl acrylate, 3-chloro-2-sulfo-1-propyl acrylate, 3-chloro-2-sulfo-1-butyl acrylate, 3-methoxy-2-sulfo-1-propyl acrylate, 2-sulfo-cyclohexyl acrylate, 2-phenyl-2-sulfoethyl acrylate, 4-sulfo-1-butyl acrylate, 6-(sulfophenoxy) hexyl acrylate and methacrylate. The preparation of such materials is disclosed in U.S. Pat. No. 3,024,221, the disclosure of which is incorporated herein by reference.

Other suitable vinyl-unsaturated additives include but are not limited to (1) salts of sulfato-esters of alpha-methylene carboxylic acids including 3-sulfato-2-hydroxy-1-propyl methacrylate, (2) salts of carboxy-terminated alkyl esters of alpha-methylene carboxylic acids including 11-methacryloxyundecanoic acid, (3) salts of sulfoalkyl allyl ethers including 3-sulfo-2-hydroxy-1-propyl allyl ether, (4) salts of acrylamide alkane sulfonates including 2-acrylamido-2-methyl propane sulfonates, (5) salts of vinyl alkyl phosphonate esters including vinyl octyl phosphonates and (6) salts of vinyl aryl sulfonates including para-styrene sulfonates.

Typically, the vinyl-unsaturated additive having both an ionic moiety and a hydrophobic moiety is present in relative amounts by weight of the total polymerizable content from about 0.1 to about 3 parts and preferably from about 0.5 to about 3 parts.

An optional modifier may be used to regulate the solvent soluble portion of the microspheres and it is added to the polymerization mixture in an amount sufficient to provide a solvent soluble portion that is in the range of 30–98%, preferably in the range of 40–95%. Various modifiers may be used within the scope of this invention and the amounts used are those that sufficiently provide the microspheres with a solvent soluble portion. Such amounts would range, for example for solvents from 5–30%, for tackifiers and/or plasticizers from 1–30% and for chain transfer agents, up to about 0.15%.

Particularly useful modifiers are chain transfer agents. To control the molecular weight of the polymer being formed in the microsphere it is desirable to use a chain transfer agent or modifier. Many halogen-and sulfur-containing organic compounds function well as chain transfer agents in free radical polymerizations. Non-limiting examples of such agents are: carbon tetrabromide, carbon tetrachloride, dodecanethiol, iso-octylthioglycolate, butyl mercaptan, and tertiary-dodecyl mercaptan. In this invention it is efficacious to employ long chain mercaptans such as dodecanethiol. The amount of chain transfer agent suitable for these microsphere polymerizations is calculated on a weight basis to the entire polymerizable content. The chain transfer agent is preferably added at up to about 0.15% more preferably up to about 0.12% and most preferably up to about 0.08%. These levels are adequate to provide a soluble polymer content in the microsphere of up to about 98%.

The microsphere adhesive composition may also contain a crosslinking agent. Examples of useful crosslinking agents include, but are not limited to: multifunctional (meth) acrylate(s), e.g., butanediol diacrylate or hexanediol diacrylate or other multifunctional crosslinkers such as divinylbenzene and mixtures thereof. When used, crosslinker(s) is (are) added at a level of up to about 0.15 equivalent weight percent, preferably up to about 0.1 equivalent weight percent, of the total polymerizable composition with the proviso that the combination of crosslinking agent and modifier concentrations are chosen to obtain a microsphere with 30 to 98% solvent soluble portion.

The microspheres of the present invention are prepared by suspension polymerization using either a one-step or two-step process as described in detail below. Suspension polymerization is a procedure wherein a monomer is dispersed in a medium (usually aqueous) in which it is insoluble. The polymerization is allowed to proceed within the individual polymer droplets. Monomer soluble free-radical initiators are preferably used. The kinetics and the mechanism are those for the corresponding bulk polymerization under similar conditions of temperature and initiator concentration.

Initiators affecting polymerization are those that are normally suitable for free-radical polymerization of acrylate monomers. Examples of such initiators include thermally-activated initiators such as azo compounds, hydroperoxides, peroxides and the like and photoinitiators such as benzophenone, benzoin ethyl ether and 2,2-dimethoxy-2-phenyl acetophenone. Other suitable initiators include lauroyl peroxide and bis(t-butyl cyclohexyl)peroxy dicarbonate. The initiator is present in a catalytically effective amount sufficient to bring about high monomer conversion in a predetermined time span and temperature range. Typically, the initiator is present in amounts ranging from 0.1 to approximately 2 parts per weight per 100 parts by weight of the polymerizable monomer starting materials.

Parameters that affect the concentration of initiator employed include the type of initiator and particular monomer and/or monomers involved. It is believed that catalytically effective concentrations range from about 0.1 to about 2 percent by weight of the total monomers and more preferably, from about 0.20 to about 0.70 percent by weight monomers and/or monomers.

Optionally, a polymeric stabilizer may be used. Advantageously, the presence of the stabilizer permits the use of relatively low amounts of surfactant while still obtaining microspheres.

Any polymeric stabilizer that effectively provides sufficient stabilization of the final polymerized droplets and prevents agglomeration within a suspension polymerization process is useful in the present invention. When used, a polymeric stabilizer will typically be present in the reaction mixture in an amount by weight of about 0.1 to about 3 parts by weight per 100 parts of polymerizable monomer, and more preferably will be present in an amount by weight of about 0.1 to about 1.5 parts by weight per 100 parts of polymerizable monomer.

Exemplary polymeric stabilizers include salts of polyacrylic acids of greater than 5000 molecular weight average (for example, ammonium, sodium, lithium and potassium salts), carboxy modified polyacrylamides (for example, Cyanamer™ A-370 from American Cyanamid), copolymers of acrylic acid and dimethylaminoethylmethacrylate and the like, polymeric quaternary amines (for example, General Analine and Film's Gafquat™ 755, a quaternized polyvinyl-pyrrolidone copolymer, or Union Carbide's "JR-400", a quaternized amine substituted cellulosic), cellulosics, and carboxy-modified cellulosics (for example, Hercules' Natrosol™ CMC Type 7L, sodium carboxy methylcellulose).

Surfactants will typically be present in the reaction mixture in an amount of no greater than about 5 parts by weight per 100 parts by weight of polymerizable monomer, preferably no greater than about 3 parts by weight, and most preferably in the range of 0.5 to 1.5 parts by weight per 100 parts by weight of polymerizable monomer.

Useful surfactants include anionic, cationic, nonionic or amphoteric surfactants and include but are not limited to anionic surfactants, such as alkyl aryl sulfonates, for example sodium dodecylbenzene sulfonate and sodium decylbenzene, sodium and ammonium salts of alkyl sulfates, for examples sodium lauryl sulfate, and ammonium lauryl sulfate; nonionic surfactants, such as ethoxylated oleoyl alcohol and polyoxyethylene octylphenyl ether; and cationic surfactants, such as a mixture of alkyl dimethylbenzyl ammonium chlorides wherein the alkyl chain contains from 10 to 18 carbon atoms. Amphoteric surfactants are also useful in the present invention and include for example sulfobetaines, N-alkylaminopropionic acids, and N-alkybetaines.

To initiate the polymerization reaction, a sufficient number of free radicals must be present. This may be achieved through several means that are well known in the art, such as heat or radiation free-radical initiation. For example, heat or radiation can be applied to initiate the polymerization of the monomers, which is an exothermic reaction. However, it is preferred to apply heat until thermal decomposition of the initiators generates a sufficient number of free radicals to begin the reaction. The temperature at which this occurs varies greatly depending upon the initiator used.

In addition, deoxygenation of the polymerization reaction mixture is often desirable. It is well known that oxygen dissolved in the reaction mixture can inhibit polymerization and it is desirable to expel this dissolved oxygen. Although, an inert gas bubbled into the reaction vessel or through the reaction mixture is an effective means of deoxygenation, other techniques for deoxgenation that are compatible with suspension polymerization can be used. Typically, nitrogen is used to deoxygenate, although any of the Group VIIIA (CAS version) inert gases are also suitable.

While specific time and stirring speed parameters are dependent upon monomers, and initiators, it is desirable to predisperse the reaction mixture until the reaction mixture reaches a state where the average monomer droplet size is between about 1 $\mu$m and 300 $\mu$m and preferably between 20 $\mu$m and 70 $\mu$m. The average particle size tends to decrease with increased and prolonged agitation of the reaction mixture.

Preferably, stirring and nitrogen purge are maintained throughout the reaction period. Initiation is begun by heating the reaction mixture. Following polymerization, the reaction mixture is cooled.

In a one-step process both the alkyl (meth)acrylate monomer and any optional comonomer are present together in the suspension at the initiation of polymerization. In a two-step process, any optional comonomer is typically added after the initial exotherm resulting from polymerization of the alkyl (meth)acrylate monomer has peaked, but could be added at any point after polymerization has started. The other components, such as the initiator, stabilizers (if used), surfactants and modifiers are present in the reaction mixture as described in the processing steps herein above.

Following polymerization, a stable aqueous suspension of microspheres at room temperature is obtained. The suspension may have non-volatile solids contents of from about 10 to about 70 percent by weight. Upon prolonged standing, the suspension typically separates into two phases, one phase being an aqueous, and essentially polymer microsphere-free phase and the other phase being an aqueous suspension of the polymeric microspheres, that is, the microsphere-rich phase. The aqueous suspension of microspheres may be utilized immediately following polymerization, because the suspension of microspheres of the present invention is particularly stable to agglomeration or coagulation. Advantageously, the microspheres of the present invention can be easily coated from an aqueous solution. Surprisingly, the microspheres of the present invention are well suited for conventional coating techniques and have enhanced fluid processing characteristics.

The microsphere-rich phase can be diluted with an additional amount of water or solvent, or redispersed upon shaking or other means of agitation. Generally, this aqueous suspension can be coated onto a backing or other substrate being employed using conventional coating methods, such as slot die coating, to provide an adhesive coating. The microspheres can be compounded with various rheology modifiers and/or latex adhesives or "binders". Typically, the adhesive coating which, when dried, exhibits a dry coating weight in the range of 2 to about 25 grams per square meter to provide an adhesive-coated sheet material in which the adhesive coating comprises polymeric microspheres, polymeric stabilizer, surfactant, and optionally rheology modifiers, and/or latex adhesives. Alternatively, the microspheres are coagulated with the use of coagulation agent(s) such as isopropanol, methanol, saturated salt solutions, or the like. The coagulant is isolated and redispersed by agitation in a suitable organic solvent, for example n-heptane. A coating can then be made from the organic solvent dispersion.

In another aspect of this invention microspheres are made as described in U.S. Pat. No. 3,691,140. The resultant microspheres are coagulated and redispersed in solvent. To this organic solvent dispersion an aqueous polyacrylamide material is added and mixed into the dispersion at a loading of 1–10% by weight. This material is then coated onto a suitable backing. With this aspect of the invention, microspheres made by such methods as described in U.S. Pat. No. 5,571,617 (Cooprider et al.); U.S. Pat. No. 5,714,237 (Cooprider et al); U.S. Pat. No. 5,118,750 (Silver et al); U.S. Pat. No. 5,045,569 (Delgado); U.S. Pat. No. 5,824,748 (Kesti et al); U.S. Pat. No. 4,786,696 (Bohnel); and U.S. Pat. No. 5,756,625 (Crandall et al), such description is incorporated herein. Such microspheres can be used in combination with the polyacrylamide, either in solvent or aqueous form, to form adhesive combinations with lower adhesion to coated paper without sacrificing the adhesion to uncoated papers.

Properties of the pressure-sensitive adhesives of the present invention can be altered by the addition of a tackifying resin(s) and/or plasticizer(s) after the polymerization. Preferred tackifiers and/or plasticizers for use herein include hydrogenated rosin esters commercially available from such companies as Hercules, Inc. under the trade names of Foral™, Regalrez® and Pentalyn™. Tackifying resins also include those based on t-butyl styrene. Useful plasticizers include but are not limited to dioctyl phthalate, 2-ethylhexyl phosphate, tricresyl phosphate and the like. If such tackifiers and/or plasticizers are used, the amounts used in the adhesive mixture are amounts effective for the known uses of such additives.

Optionally, adjuvants, such as, rheology modifiers, colorants, fillers, stabilizers, pressure-sensitive latex binders and various other polymeric additives can be utilized. If such adjuvants are used, the amounts used in the adhesive mixture are amounts effective for the known uses of such adjuvants.

Backings used as substrates for adhesive articles may be materials that are conventionally used as a tape backing or may be of other flexible material. Such backings include, but are not limited to, those made from materials selected from the group consisting of poly(propylene), poly(ethylene), poly(vinyl chloride), polyester (e.g., poly(ethylene terephthalate), such as those available under the trade designation of "Scotch" film 8050 from 3M), polyamide films such as that available from DuPont Co., under the trade designation "KAPTON," cellulose acetate, and ethyl cellulose. Backings may also be of woven fabric formed from threads of synthetic or natural materials such as cotton, nylon, rayon, glass, or ceramic material, or they may be of nonwoven fabric such as air laid webs of natural or synthetic fibers or blends of these. In addition, the backing may be formed of materials selected from the group consisting of metal, metallized polymeric film, and ceramic sheet material. Papers either coated or uncoated may also be used as the backing in the construction.

Preferred such materials include, but are not limited to, papers either coated or uncoated, plastics such as polyethylene, polypropylene, polyesters, cellulose acetate, poly(vinyl chloride), and poly(vinylidine fluoride), as well as paper or other substrates coated or laminated with such plastics. These coated papers or thermoplastic films are often siliconized or otherwise treated to impart improved release characteristics. One or both sides of the backings or liners could have such release characteristics. Generally the backing or substrate material is about 50 $\mu$m to about 155 $\mu$m in thickness, although thicker and thinner backing or substrate materials are not precluded.

The adhesive coated article may further comprise a low adhesion backsize coating on at least a portion of the second major surface, such that the low adhesion backsize coating is positioned directly under the microsphere adhesive layer on the first major surface, such that when at least two adhesive coated articles are stacked upon another, the microsphere adhesive layer of a first adhesive coated article is contiguously positioned on top of the low adhesion backsize coating of a second adhesive coated article. Low adhesion backsize coatings are well-known in the art and are generally selected to be compatible with the adhesive formulations to provide a peel adhesion in the range of approximately 40 grams/inch. Descriptions of such low adhesion backsize coatings are found in Handbook of Pressure Sensitive Adhesive Technology, Second Addition, Edited by D. Satas, 1989.

Particularly useful articles prepared using the adhesive microspheres of the present invention include repositionable adhesive products such as repositionable note and paper products, repositionable tape and tape flags, easel sheets, transfer sheets and tapes, signage, repositionable glue sticks and the like, but may also include other non-repositionable industrial commercial, and medical adhesive products.

The present invention is further illustrated by the following examples, but the particular materials and amounts thereof recited in these examples, as well as other conditions and details, should not be construed to unduly limit this invention. All materials are commercially available or known to those skilled in the art unless otherwise stated or apparent. The following examples are illustrative in nature and are not intended to limit the invention in any way. All percentages listed in the Tables that follow are calculated on a weight basis to total monomer and vinyl unsaturated additive content.

EXAMPLES

Test Methods
Solvent Soluble Polymer Content:

To determine the solvent soluble content of the prepared microspheres, the following process is used.

One gram of the water suspension of microspheres is dried in a vacuum oven without heat. After drying, 100 ml of n-heptane is added and shaken for 24 hours. After shaking, the dispersion is poured through a filter paper (30 micrometer pores) to remove the non-soluble content. The filtrate is then dried in a 38° C. oven.

The weight of the dried filtrate divided by the dried suspension microspheres is the % solvent soluble polymer content. The test is repeated and the data is reported as the average of the number of trials.

Peel Adhesion to Bond Paper (Uncoated Paper):

Peel adhesion is the force required to remove an adhesive coated sheet from a bond paper substrate at a specific angle and rate of removal. In the examples, this force is expressed in grams per one inch (grams/2.54 cm) width of adhesive coated sheet. The procedure followed is:

A strip, one inch (2.54 cm) wide, of adhesive coated sheet was applied to the horizontal surface of 9.1 kilogram bond paper (21.8 cm.×28.2 cm). A 2.04 kilogram hard rubber roller was used to firmly apply the strip to the bond paper. The free end of the coated sheet was attached to the adhesion tester load cell such that the angle of removal was 90 degrees. The test plate was then clamped in the jaws of the tensile testing machine that was capable of moving the plate away from the load cell at a constant rate of 30.8 centimeters per minute. A load cell reading in grams per inch of coated sheet was recorded. The samples were tested three times. The average value of the three tests is reported.

Peel Adhesion to Coated Paper:

Peel adhesion is the force required to remove a coated sheet from a coated paper substrate at a specific angle and rate of removal. The coated paper used is commercially available as Kromkote™ paper and is used as the standard when comparing various formulations of the present invention. Except as noted in the Examples, all references to Peel Adhesion to Coated Paper are to Kromkote™ paper. In the examples, this force is expressed in grams per one inch (grams/2.54 cm) width of coated sheet. The procedure followed is:

A strip, one inch (2.54 cm) wide, of adhesive coated sheet was applied to the horizontal surface of 9.1 kilogram coated paper (21.8 cm.×28.2 cm). A 2.04 kilogram hard rubber roller was used to firmly apply the strip to the coated paper. The laminate was aged in a 21° C./80% relative humidity environment for three days. The free end of the coated sheet was attached to the adhesion tester load cell such that the angle of removal was 90 degrees. The test plate was then clamped in the jaws of the tensile testing machine capable of moving the plate away from the load cell at a constant rate of 30.8 centimeters per minute. A load cell reading in grams per inch of coated sheet was recorded. The samples were tested three times. The average value of the three tests is reported.

Example 1

To a two liter, three necked flask equipped with a thermometer mechanical stirrer and nitrogen inlet tube was charged 602.75 gm of deionized water, 17.5 gm of a 10% solids solution of Stepanol AMV (trade name for a 28% solids solution of ammonium lauryl sulfate commercially available from Stepan Company), 35.0 gm of a 10% solids solution of Goodrite K702 (trade name for a 25% solids solution of polyacrylic acid, 240,000 weight average molecular weight, commercially available from B.F. Goodrich Company) which had been neutralized to a pH of 7.0 with concentrated ammonium hydroxide, 7.00 gm acrylamide and 3.50 gm acrylic acid. This solution was mixed at 150 rpm until uniform and purged with nitrogen. The agitation rate was set at 380 revolutions per minute (RPM), To the above solution was added a mixed solution of 339.5 gm of isooctyl acrylate, 0.11 gm dodecane thiol and 1.05 gm of Perkadox 16N (trade name for a 95% active bis (4-tert-butylcyclohexyl) peroxydicarbonate initiator commercially available from AKZO Chemicals Inc.). The reaction mixture was heated to 50° C. The stirring, and nitrogen purge was maintained throughout the reaction period. The reaction was initially set at 50° C. and exothermed after a few minutes and peaked at 77° C. The batch was maintained at 50° C. for 22 hours, cooled and filtered through a cheese cloth. The weight of the coagulum collected on the cheese cloth was measured and reported as % coagulum by weight to monomer (0.37%). The particle size was 57 μm and the solvent soluble level was 18%.

Example 2–4

The reaction process as described in Example 1 was repeated for examples 2–4 with increased levels of acrylamide monomer added. See Table 1 below.

TABLE 1

| Example | IOA (gms) | AcM (gms) | Peak Temp (° C.) | % Coagulum | % Solvent Soluble Content | Particle Size (μm) |
|---|---|---|---|---|---|---|
| 2 | 332.5 | 14.0 | 75 | 0.07 | 27 | 50 |
| 3 | 325.5 | 21.0 | 75 | 0.1 | 22 | 57 |
| 4 | 318.5 | 28.0 | 74 | 0.05 | 18 | 61 |

Comparative Example C1

The reaction process as described in Example 1 was repeated except that the acrylamide monomer not added. See Table 2 below.

TABLE 2

| Example | IOA (gms) | AcM (gms) | Peak Temp (° C.) | % Coagulum | % Solvent Soluble Content | Particle Size (μm) |
|---|---|---|---|---|---|---|
| C-1 | 346.5 | 0 | 76 | 0.25 | 44 | 88 |

The above samples were coated onto paper at a coating weight of approximately 5.06 gms/sq.meter and dried at 107° C. The resulting coatings were tested for adhesion to bond paper and adhesion to coated paper as described in the test methods section above. The results are reported in the Table 3 below.

TABLE 3

| Example | % Acrylamide | Adhesion to Bond Paper (gms/inch) | Adhesion to Kromkote ® Paper (gms/inch) |
|---|---|---|---|
| 1 | 2 | 45 | 230 |
| 2 | 4 | 51 | 212 |
| 3 | 6 | 46 | 187 |
| 4 | 8 | 37 | 156 |
| C-1 | 0 | 71 | 288 |

Example 5

To a five liter, three necked flask equipped with a thermometer mechanical stirrer and nitrogen inlet tube was charged 2169.9 gm of deionized water, 63.0 gm of a 10% solids solution of Stepanol AMV (trade name for a 28% solids solution of ammonium lauryl sulfate commercially available from Stepan Company), 126.0 gm of a 10% solids solution of Goodrite K702 (trade name for a 25% solids solution of polyacrylic acid, 240,000 weight average molecular weight, commercially available from B.F. Goodrich Company) which had been neutralized to a pH of 7.0 with concentrated ammonium hydroxide, 75.6 gm acrylamide and 12.6 gm acrylic acid. This solution was mixed at 200 rpm until uniform and purged with nitrogen. The agitation rate was set at 410 revolutions per minute (RPM). To the above solution was added a mixed solution of 1171.8 gm of isooctyl acrylate, 0.50 gm dodecane thiol and 3.78 gm of Perkadox 16N (trade name for a 95% active bis (4-tert-butylcyclohexyl) peroxydicarbonate initiator commercially available from AKZO Chemicals Inc.). The reaction mixture was heated to 50° C. The stirring, and nitrogen purge was maintained throughout the reaction period. The reaction was initially set at 50° C. and exothermed after a few minutes and peaked at 81° C. The batch was maintained at 50° C. for 22 hours, cooled and filtered through a cheese cloth. The weight of the coagulum collected on the cheese cloth was measured and reported as % coagulum by weight to momomer (0.33%). The particle size was 48 μm and the solvent soluble level was 22%.

The suspension was coagulated by the addition of a coagulating agent, squeezed dry, and then dispersed in a heptane/isopropanol (95/5) solvent at 8.4% solids. These solvent dispersed microspheres were then coated onto paper using a bar coater set at 100 μm, dried in an oven at 104° C. (until dry) and tested for adhesion. The adhesion to coated paper was 137.1 gms/inch.

Example 6–9 and Comparative Example C2

A microsphere adhesive sample was prepared as described in U.S. Pat. No. 3,691,140 utilizing an isooctyl acrylate to ammonium acrylate ratio of 97.6/2.4. The particle size was 38 μm and the solvent soluble level 20%. The suspension was coagulated and redispersed in n-heptane at 9% solids. To this solvent dispersion amounts of aqueous polyacrylamide were added in the quantity listed (on a weight to weight basis) in Table 4. The samples were coated onto polyester film using a bar coater set at 75 μm. The coatings were dried at 66° C. for fifteen minutes.

TABLE 4

| Example | % Polyacrylamide | [1]Polyacrylamide Molecular Wt. | Adhesion to Bond Paper (gms/inch) | Adhesion to Kromkote ® Paper (gms/inch) |
|---|---|---|---|---|
| 6 | 0.8 | 10,000 | 16 | 97 |
| 7 | 0.4 | 10,000 | 31 | 136 |
| 8 | 0.8 | 1500 | 22 | 102 |
| 9 | 1.6 | 1500 | 13 | 80 |
| C2 | 0 | NA | 60 | 267 |

[1]Polyacrylamide (50% aqueous solution): Aldrich Chemical Company Milwaukee, WI 53233.

Examples 10–11

Using the same formulation as described in Example 6 coatings were made at a bar coating thickness of 50 μm and 100 μm. The coatings were dried at 66° C. for fifteen minutes. The results appear in Table 5 below.

TABLE 5

| Example | Coating Gap (mils) | Adhesion to Bond Paper (gms/inch) | Adhesion to Kromkote ® Paper (gms/inch) |
|---|---|---|---|
| 10 | 2 | 15 | 108 |
| 11 | 4 | 29 | 165 |

Comparative Example 12

Several commercially available adhesive-coated repositionable notes where tested according to the test methods described above. The Adhesion to Bond (grams/inch) and Adhesion to Coated Paper (grams/inch) were measured and the results are summarized in Table 6.

TABLE 6

| Sample | Adhesion to Bond (grams/inch) | Adhesion to Kromkote ® Paper (grams/inch) | Transfer to Kromkote ® Paper |
|---|---|---|---|
| Beautone Notes that Stick | 40.0 | 437.4 | Yes (some) |
| Janel Memo Tip | 257.8 | 895.8 | Yes (heavy) |
| Rediform Note Stix | 45.6 | 657.2 | Yes (heavy) |
| Highland ™ #6549 | 45.8 | 375.0 | Yes (slight) |
| Post-it ® Notes | 72.0 | 391.6 | Yes (slight) |
| Esselte Contacta Notes | 37.2 | 572.4 | Yes (some) |
| Pronoti Stick on Notes | 62.8 | 377.2 | Yes (slight) |
| Converex Sticky Notes | 143.0 | 559.4 | Yes (heavy) |
| Example 1 | 45.0 | 230.0 | No |

Comparative Example 13

Several commercially available adhesive-coated repositionable notes where tested according to the test methods described above. The peel adhesion to the coated card stock used in this examples was measured using the same procedure as described in the test method "Peel Adhesion to Coated Paper". The results are summarized in Table 7.

TABLE 7

| Sample | Adhesion to Elk Cover II (grams/inch) | Adhesion to Master Print (grams/inch) | Adhesion to Stock Backing (grams/inch) |
|---|---|---|---|
| Beautone Notes that Stick | 94.4 | 99.0 | 126.0 |
| Janel Memo Tip | 204.8 | 252.5 | 318.5† |
| Rediform Note Stix | 93.8 | 105.6 | 156.0 |
| Highland ™ #6549 | 84.1 | 94.1 | 141.5 |
| Post-it ® Notes | 114.4 | 127.5 | 151.8 |
| Esselte Contacta Notes | 91.8 | 124.1 | 143.9 |
| Pronoti Stick on Notes | 84.9 | 109.4 | 118.3 |
| Converex Sticky Notes | 119.4* | 187.6* | 210.5* |

*Adhesive coating transferred to all three coated card stocks.
†Adhesive coating exhibited slight adhesive transfer to the Stock Backing Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. An adhesive coated article comprising a substrate with a first and second major surface and a layer of microsphere adhesive on at least a portion of the first major surface of the substrate, wherein the microspheres of the microsphere adhesive are the reaction product of
    (a)(i) at least one alkyl (meth)acrylate ester wherein the alkyl group contains four to about 14 carbon atoms and
    (ii) at least one nonpolar comonomer, ionic comonomer, polar comonomer or mixtures of such comonomers and
    (b) the microsphere adhesive further contains 1–10% by weight of an aqeous polyacrylamide material.

2. The adhesive coated article according to claim 1 wherein the microsphere adhesive has a 90° peel value, as measured on clay-coated paper in the range of 20 to 250 grams/in.

3. The adhesive coated article according to claim wherein component (ii) is a (meth)acrylamide monomer.

4. The adhesive coated article according to claim 1 wherein the microsphere adhesive comprises a plurality of hollow, polymeric, acrylate, inherently tacky, infusible, solvent-insoluble, solvent dispersible, pressure sensitive microspheres comprising(a) at least about 85 parts by weight of at least one alkyl acrylate ester or alkyl methacrylate ester, and (b) up to about 15 parts by weight of at least one polar monomer, wherein a majority of the microsperes contain at least one interior void having a diameter at least about 10% of the diameter of the hollow microspheres.

5. The adhesive coated article according to claim 1 wherein a microsphere adhesive comprises composite pressure sensitive adhesive microspheres comprising a mixture of two or more wafer insoluble polymers that are present wholly within the boundaries of the microspheres, wherein at least one water insoluble polymer is a solute polymer and at least one water insoluble polymer is a matrix polymer.

6. The adhesive coated article according to claim 1 wherein the microsphere adhesive comprises composite pressure sensitive adhesive microspheres comprising a mixture of two or more water insoluble polymers that are present wholly within the boundaries of the microspheres, wherein at least one water insoluble polymer is a solute polymer and at least one water insoluble polymer is a matrix polymer, and wherein the solute polymer is a homopolymer or copolymer prepared from (meth)acrylamide monomers.

7. The adhesive coated article according to claim 1 further comprising a low adhesion backsize coating on at least a portion of the second major surface, such that the low adhesion backsize coating is positioned directly under the microsphere adhesive layer on the first major surface, such that when at least two adhesive coated articles are stacked upon another, the microsphere adhesive layer of a first adhesive coated article is contiguously positioned on top of the low adhesion backsize coating of a second adhesive coated article.

* * * * *

UNITED STATES PATENT AND TRADEMARK OFFICE
CERTIFICATE OF CORRECTION

| | |
|---|---|
| PATENT NO. | : 6,296,932 B1 |
| DATED | : October 2, 2001 |
| INVENTOR(S) | : Michael D. Crandall et al. |

It is certified that error appears in the above-identified patent and that said Letters Patent is hereby corrected as shown below:

<u>Column 14,</u>
Line 22, "claim wherein" should read -- claim 1 wherein --.
Line 35, "wherein a" should read -- wherein the --.
Line 37, "wafer" should read -- water --.

Signed and Sealed this

Twenty-third Day of April, 2002

Attest:

JAMES E. ROGAN
*Attesting Officer*     *Director of the United States Patent and Trademark Office*